United States Patent [19]

Kaylor

[11] Patent Number: 5,200,083
[45] Date of Patent: Apr. 6, 1993

[54] SKIMMER AND METHOD FOR ITS USE

[75] Inventor: Joseph B. Kaylor, Manassas, Va.

[73] Assignee: Jannette Gomez Kaylor, Manassas, Va.

[21] Appl. No.: 778,295

[22] Filed: Oct. 16, 1991

[51] Int. Cl.⁵ .............................................. E02B 15/04
[52] U.S. Cl. ..................................... 210/671; 210/680;
 210/693; 210/776; 210/242.3; 210/242.4;
 210/923; 210/924
[58] Field of Search ................ 210/671, 680, 691, 693,
 210/694, 776, 923, 924, 242.3, 242.4

[56] References Cited

U.S. PATENT DOCUMENTS

| | | | |
|---|---|---|---|
| 3,344,062 | 9/1967 | Kosar | 210/693 |
| 3,426,902 | 2/1969 | Kilpert et al. | 210/242.3 |
| 3,567,660 | 3/1971 | Winkler | 210/693 |
| 3,643,804 | 2/1972 | Sharpton | 210/242.4 |
| 3,667,608 | 6/1972 | Burroughs et al. | 210/924 |
| 3,670,896 | 6/1972 | Hale, Jr. et al. | 210/242.3 |
| 3,960,722 | 6/1976 | Tomikawa et al. | 210/693 |
| 3,968,041 | 7/1976 | DeVoss | 210/923 |
| 4,021,344 | 5/1977 | Webb | 210/242.3 |
| 4,172,036 | 10/1979 | Morris | 210/242.3 |
| 4,264,450 | 4/1981 | Ayers et al. | 210/693 |
| 4,529,496 | 7/1985 | Kruyer | 210/924 |
| 4,681,680 | 7/1987 | Delons et al. | 210/242.3 |
| 4,957,636 | 9/1990 | Wilson et al. | 210/242.3 |

FOREIGN PATENT DOCUMENTS

54-30659  3/1979  Japan .
262021  7/1970  U.S.S.R. .

Primary Examiner—Stanley S. Silverman
Assistant Examiner—Christopher Upton
Attorney, Agent, or Firm—Roland H. Shubert

[57] ABSTRACT

The performance of mechanical skimmers for the removal of oil from water is enhanced through use of an oil-avid contacting member consisting of a non-woven mat of oleophilic fibers; the fiber surfaces having a film coating of a non-crosslinked rubber. A drum-type skimmer having the drum surfaces covered with such an oil-avid mat may be operated at very high rim speeds to obtain high rates of oil recovery with little water contamination. A process for coating the fiber surfaces with a rubber film is also disclosed.

19 Claims, 5 Drawing Sheets

SKIMMER AND METHOD FOR ITS USE

BACKGROUND OF THE INVENTION

1. Field of the Invention

This invention relates generally to devices for removing floating oil from water.

More particularly, this invention relates to improvements in the construction and operation of oil skimmers, especially oil skimmers of the type using a rotating drum to pick up oil from the surface of a body of water.

In a specific embodiment, this invention relates to the use of certain materials and compositions as the oil contacting surface to enhance the capacity and efficiency of the skimming device.

In yet another embodiment, this invention relates to an improved process for operating oil skimmers allowing a substantial increase in their oil recovery capacity.

2. Description of the Related Art

The cleanup of crude oil and refined petroleum products spills on inland waterways, harbors and at sea is of ever increasing environmental and regulatory concern. Traditionally, three approaches have been taken to dealing with such hydrocarbon spills. The first approach has been to let nature take its course with the hydrocarbon either evaporating or dispersing into the water column. A second approach has been to apply chemical dispersants to the spill causing it to disappear from the water surface and spread within the water column. The last approach has been to collect the spilled hydrocarbon and remove it from the water surface using mechanical means; typically skimmers of one sort or another.

Doing nothing to clean up an oil spill is becoming increasingly unacceptable. The environmental impact of chemically dispersing oil in the water column is coming under more question. Consequently, the mechanical collection and removal of spilled hydrocarbons is now a favored approach to dealing with oil spills. The most commonly used systems for the mechanical recovery of spilled oil use skimmers which may be of the rotating disc, rotating drum, or belt type. All of those skimmers have one element in common. That is, a member having a surface arranged to be preferentially wet by oil rather than water and moving alternately into and out of the oil layer. As the member contacts oil, a film or layer sticks or clings to the surface of the member and is then carried by movement of the member out of the oil layer to a recovery zone where the oil is removed. Removal of oil from the surface of the member is typically accomplished by mechanical means such as, for example, a scraper or roller contacting or compressing the oil wet surface.

There are a number of variations of rotating disc skimmers disclosed in the prior art. Illustrative patents include U.S. Pat. No. 4,021,344 which discloses a skimmer having a plurality of discs fabricated of a plastic such as rigid polyvinyl chloride with the disc axes arranged about the circumference of a circle and driven from a central drive member. The discs pass through the oil-water surface and pick up oil which is removed from the discs by a scraper and pumped to a collection point. Another skimmer of different configuration but of generally similar mode of operation is described in the Morris U.S. Pat. No. 4,172,036. Morris also prefers to use discs of polyvinyl chloride and teaches that the oil adhering quality of the discs is improved by sanding the disc sides with 600 grit sand paper.

Likewise, there are a variety of rotating drum skimmers described in the patent literature. Examples here include patents to Kilpert et al, U.S. Pat. No. 3,426,902; to Delons et al, U.S. Pat. No. 4,681,680; and to Wilson et al, U.S. Pat. No. 4,957,636. All three patents teach the use of a drum surface having hydrophobic characteristics. Kilpert et al use a deformable spongy-type material for the drum surface preferring sponge plastics such as polyethylene, polypropylene or polyurethane for that purpose. The sponge cover is compressed by a roller just before it contacts the oil layer and draws oil into the sponge as the member expands during its passage through the oil. The oil filled sponge is then compressed by a second roller to wring oil from it for collection. Delons et al teach the use of a drum constructed of a hydrophobic-oleophilic material and patentees suggest for this purpose stainless steel, black steel, aluminum or a plastic material. Wilson et al disclose the use of such oil wettable and corrosion resistant materials as polyethylene and polypropylene for drum construction.

Mechanical skimmers tend to pick up some water along with the recovered oil. The amount of water picked up increases as the speed which the contacting member travels through the oil and water increases. That behavior is generally true whether the contacting member is a disc, a drum, a belt or of some other configuration. It is desirable that spilled oil and other hydrocarbons be recovered as free of water contamination as possible as reclamation and reuse of the recovered oil is facilitated and the storage and transport facilities at a spill scene are ordinarily limited. Further, there is a limit to the rate of fluid pickup by the contacting member without the fluid being flung off by the movement of that member. Hence, skimmers are ordinarily operated at rates below that of maximum fluid pickup in order to limit the amount of water recovered with the oil.

A major limitation with most existing skimmers is that the equipment is heavy and bulky in comparison to its skimming capacity making transport to the spill site difficult. Further, the performance of many skimmers is strongly dependent upon the sea state and upon the viscosity of the hydrocarbon being recovered. Consequently, the advantages of a light, easily deployed, large capacity skimmer capable of recovering oil essentially free from water can readily be appreciated.

SUMMARY OF THE INVENTION

This invention provides a high capacity drum skimmer for the removal of oil and other hydrocarbons floating on water and provides as well a method for the use of that skimmer at high recovery rates with essentially no water contamination. The drum surface which contacts oil is covered with a textured material treated to provide it with a extraordinary affinity for hydrocarbons. In a preferred embodiment, the drum is mounted within a frame constructed of relatively large diameter tubing or pipe which acts as a collection area about the front and leading sides of the drum and also acts as a suction conduit to remove oil from the skimmer. An extremely high capacity for oil recovery is obtained by rotating the drum at a rate far higher than is ordinarily used with drum skimmers so that water carried on the drum with the oil is separated therefrom and is flung beyond the bounds of a collection trough while oil clings to the textured drum surface for removal therefrom by use of a scraper blade. The textured drum cover material may also be used with disc and belt skimmers to enhance the performance thereof.

Hence, it is an object of this invention to provide improvements in skimming devices for the removal of hydrocarbons floating on the surface of water.

It is a specific object of this invention to provide a light, easily deployable, high capacity drum skimmer having a drum surface covered with a textured material having an avid affinity for hydrocarbons.

It is yet another object of this invention to provide a textured, oil-avid contact material for use with all types of oil skimming devices.

Still another object of this invention is to provide a method to enhance the performance of a drum skimmer allowing it to pick up essentially water-free oil at an extremely fast rate.

Other objects of this invention will be apparent from the following description of certain preferred embodiments.

BRIEF DESCRIPTION OF THE DRAWINGS

Specific embodiments of the invention are illustrated by the drawings in which.

DESCRIPTION OF THE PREFERRED EMBODIMENTS

Figure 1:
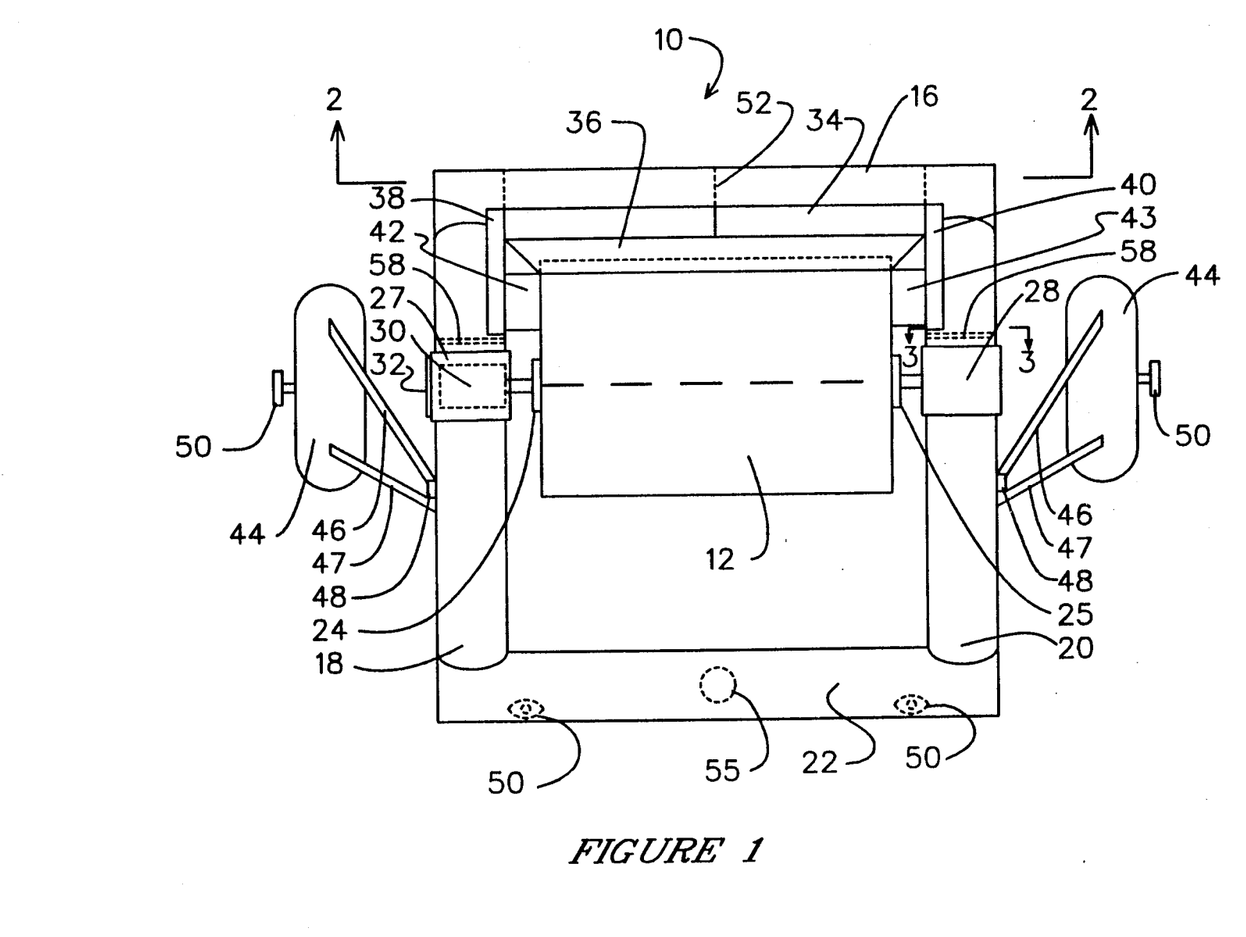
FIG. 1 is a plan view of one preferred embodiment of this invention.

The invention will be described with reference to the drawings in which FIG. 1 illustrates one presently preferred embodiment of a drum skimmer 10 shown in plan view and constructed in accordance with the invention. A cylindrical drum 12 is supported within a generally rectangular frame having a front member 16, two side members 18 and 20, and a rear member 22. It is convenient and preferred that the frame members be constructed of tubing or light pipe and may be of a metal or a structural plastic. A corrosion resistant aluminum alloy is preferred as a material of construction for the frame members.

Drum 12 is journeled through hubs 24 and 25 between frame supports which may be squared sections 27 and 28 located in side members 18 and 20 respectively. Hubs 24 and 25 are shown in more detail in FIGS. 6 and 7. Section 27 also serves as a mount and protective compartment for motor 30 which preferably is an air motor-speed reducer combination but which may also be a hydraulic motor or an explosion proof electric motor. Access to motor 30 may be gained through section cover 32.

A slot 34 is provided in the upper rear quadrant of front frame member 16 facing the drum 12. Slot 34 extends across the entire length of drum 12 and has attached to the lower rearward lip thereof a flexible scraper member 36. Scraper 36 is arranged so that its free side rides on the drum surface to divert oil carried on the surface thereof into the slot 34 as the drum rotates. In similar fashion there is provided slot 38 in the upper inside quadrant of side frame member 18 and a like slot 40 located in the upper inside quadrant of frame member 20. Slots 38 and 40 extend along the sides of drum 12 from a point beyond the periphery of the drum at least about half the distance to the drum axis. A flexible scraper member 42 is attached to the lower lip of slot 38 and is arranged so that its free side rides on the drum end to divert oil carried thereon into slot 38. A similar scraper member 43 is attached to the lower lip of slot 40 to ride on the other drum end and to divert oil carried thereon into slot 40.

Figure 5:
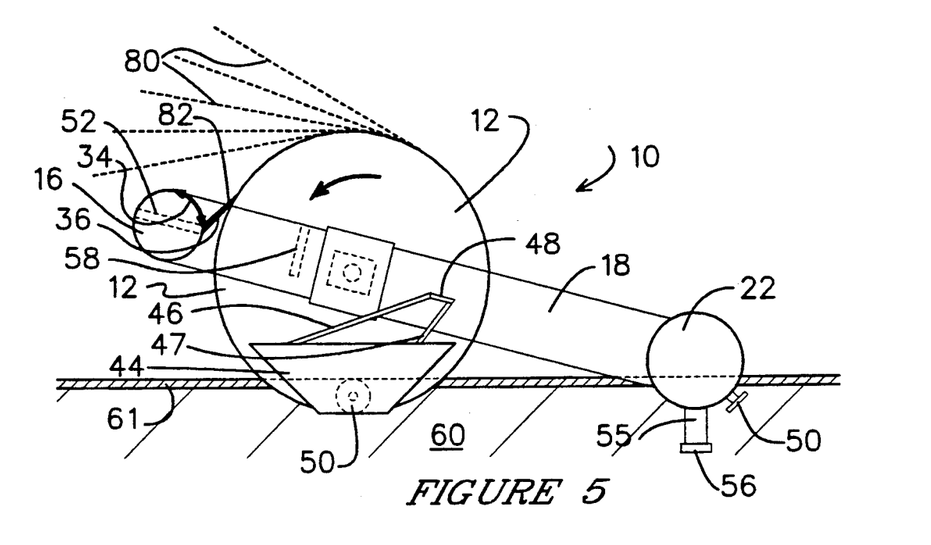
FIG. 5 is a side view of the skimmer of FIG. 1 deployed in water.

Although it is not necessary to the operation of the skimmer, an outrigger may be provided on each side of the skimmer frame to add stability to the skimmer especially in choppy water. As is shown in FIGS. 1 and 5, each outrigger includes a float member 44 which may be attached to the skimmer side members 18 and 20 by means of support arms 46 and 47 through attachment bracket 48. The bottom of float members 44 is preferably fixed at a level approximating the bottom of drum 12 and the midpoint of the float members is appropriately placed below the drum axis. Floats 44 may be shaped to increase the amount of water displaced as the depth of immersion increases so as to provide a progressively increasing flotation effect. A sacrificial anode assembly 50, shown in greater detail in FIG. 8, may be located on each float 44. At least one, and preferably two, similar anode assemblies are attached to a lower region of rear frame member 22.

Figure 2:
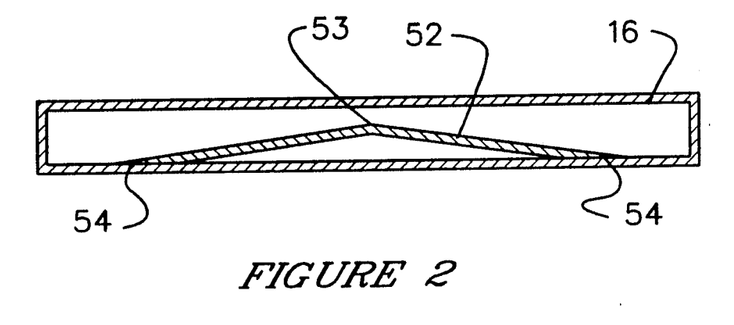
FIG. 2 is a sectional view taken along the line 2—2 of FIG. 1.

A flow divider baffle 52, shown best in the FIG. 2 sectional view, is placed within front frame member 16. Baffle 53 slopes downwardly from an apex 53 at the midpoint of member 16 toward both ends of member 16 terminating at a point 54 short of the member end. The flow of oil which is diverted into slot 34 of member 16 by the action of wiper or scraper member 36 on drum 12 thus is split into two relatively equal streams; one directed toward each side member of the skimmer frame. Splitting of the flow of recovered oil in that fashion prevents the total flow from going to one side or the other as the skimmer body is tilted by wave action. Oil flowing from the apex to the ends of baffle 53 is directed to the side members 18 and 20 joining those streams of oil wiped from the drum ends.

FIG. 5 depicts the attitude of the skimmer 10 in an operating position floating on a body of water 60 having a layer of oil 61 thereon. When the skimmer 10 is deployed on water, frame side members 18 and 20 tilt downwardly toward the rear with front frame member 16 at a level substantially above that of the rear frame member 22. Thus oil collected from the drum will flow through the side members to rear member 22 under the force of gravity alone. A oil exit port 55 is provided on the bottom side of rear frame member 22 for connection to a close-coupled pump through flange connector 56. Exit port 55 is desirably directed downwardly if the skimmer is to be used in deep water, more than about three feet, as that adds to the stability of the skimmer.

Figure 10:
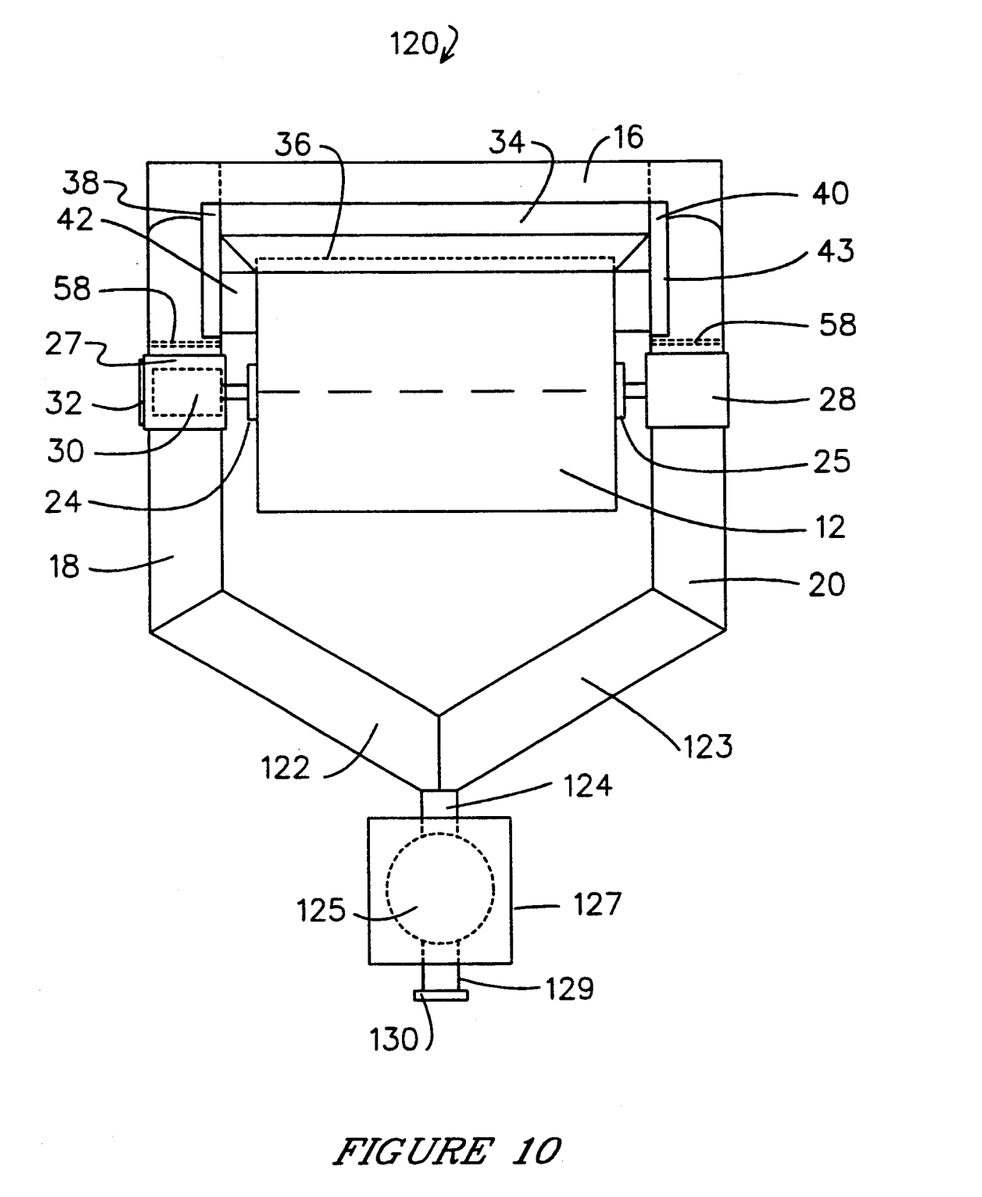
FIG. 10 is a plan view of another embodiment of the skimmer of this invention.

When used in shallow water port 55 can be directed backwardly to decrease the skimmer draft. The pump may be located on a work boat or barge adjacent the skimmer, may be placed in a floating pump station servicing the skimmer, or may be incorporated as an integral part of the skimmer as shown in the embodiment of FIG. 10. In all instances it is desirable that the pump be located as close to the skimmer as is practical so that a positive suction can be maintained at the exit port 55. Pumps suitable for use with the skimmers of this invention are those of the positive displacement type, self priming, and capable of running dry, in the absence of fluid flow, without harm to the pump. Peristaltic pumps are generally suitable as are those of the air-operated diaphragm type.

Figure 3:
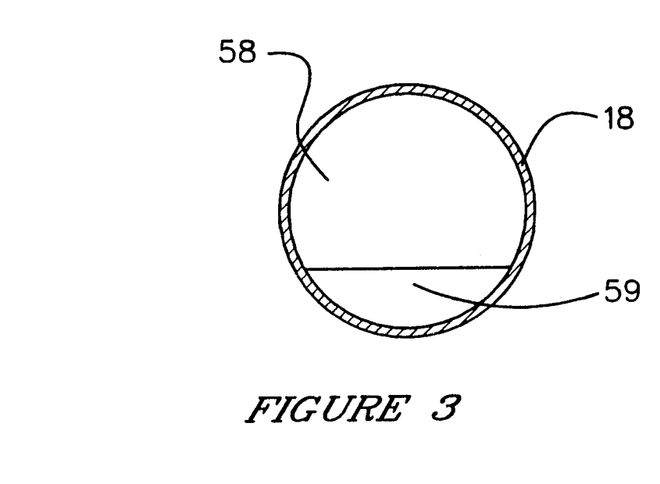
FIG. 3 is a sectional view taken along the line 3—3 of FIG. 1.

The rate of oil flow through the side members is enhanced by the provision of a flow baffle 58 placed in each of side members 18 and 20 just back of the rear end of slots 38 and 40 respectively. Baffle 58, best shown in the FIG. 3 sectional view, blocks off most of the area within the side members leaving a free space 59 at the bottom thereof. Space 59 appropriately may comprise some 15% to 25% of that channel area within the side members. Baffle 58 performs two important functions. First, it serves as a trash guard tending to prevent the entry of floating trash into side members 18 and 20 which might clog or interfere with the action of a downstream pump and flow lines. Second, during those times at which oil is flowing from the drum and into the side members, baffle 58 serves as a liquid seal maintaining a partial vacuum within the rearward portions of the side members and in the rear frame member as well. That partial vacuum tends to actively suck oil from the open slot area of the forward skimmer frame and remove oil from that area as fast as it is delivered by the rotating drum 12.

As is best seen in FIG. 5, the drum and frame members are dimensioned so that the side frame members tilt backwardly when the skimmer is deployed in water. The angle defined by the backwardly tilting side frame members and the water surface may appropriately range from about 10° to 20° and preferably is about 15°. Essentially all of the flotation for the skimmer is provided by the drum 12 and the outrigger floats 44, if used. Rear member 22 does provide a bit of flotation but its basic function is to maintain a rearwardly tilted orientation of the skimmer frame. The diameter of skimmer drum 12 is not critical but preferably is on the order of 18 to 24 inches as those dimensions have been found to provide good performance. In one exemplary skimmer generally constructed in accordance with FIG. 1, drum 12 was 24 inches in diameter and 36 inches in length. Front member 16 and side members 18 and 20 were constructed of 6 inch diameter aluminum pipe and rear member 22 was constructed of 8 inch diameter aluminum pipe The frame was square measuring 54 inches on a side. Motor 30 was a one-half horsepower, vane type air motor with an integral speed reducer providing an adjustable drum speed of 33 to 333 rpm.

The outside circumference and the ends of drum 12 must be covered with an oil-avid contact material in order for the skimmer to achieve its extraordinarily high rates of oil pickup with low water contamination. It is well known in the prior art of mechanical skimmers that the surface characteristics of the oil-contacting member affects the oil pickup rate. Prior art mechanical skimmers, whether of the drum, disc or belt type, ordinarily use a hydrophobic and oleophilic material to form or surface the oil contact member. It is typical to use a plastic, usually polyvinyl chloride or a polyolefin, for that purpose. While the skimmers of this invention will operate at least as well as conventional skimmers with the drum surfaces of such materials, substantial additional advantage is achieved through use of special oil contact materials. Those special, oil-avid contact materials will be described in relation to FIG. 4.

Figure 4:
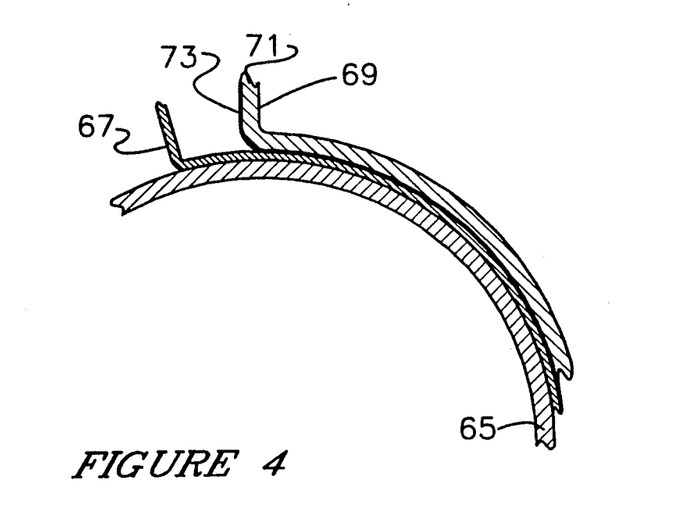
FIG. 4 is a detailed section of the drum cover.

FIG. 4 is a partial sectional view of the oil pickup drum 12. Wall 65 of drum 12 is constructed of a structural material having substantial physical strength so as to resist deformation during use. Thin walled aluminum pipe has been found to be satisfactory for that purpose. A layer of a plastic material 67 is placed around drum wall 65 encircling the entire drum. Material 67 may conveniently be a polyolefin sheeting having a thickness of some 20 to 50 mils of the type sold for use in lining chemical and acid tanks. Sheeting 67 is formed into a cylinder and is stretched over drum 12 to form a friction fit upon the drum. A second, oil contacting mantle 69 is secured to the outer surface of sheeting 67. Mantle 69 consists of an outer layer 71 of a specially treated, thin, non-woven mat or rug made up of fibers of an oleophilic polymer, preferably a polyolefin and most preferably polypropylene, and preferably backed on one side with a heavy polyolefin film cover 73. Thickness of the film backed, non-woven mat layer may be on the order of one-sixteenth inch and such materials are commercially available. It is the film cover side 73 of mantle 69 which is secured through use of suitable adhesives or heat bonding to the outer surface of sheeting 67. It is to be noted that mantle 69 may be adhesively attached directly to drum wall 65 but that arrangement is less preferred as it increases the difficulty of replacing the drum cover. Use of a friction fitted sheeting layer allows the mantle and sheeting to be simply cut away to leave a clean drum surface when replacement of the mantle is required.

As has been stated previously, the non-woven outer mat layer 71 of mantle 69 must be specially treated in order to render it oil avid. That treatment is accomplished in the following manner. A non-crosslinked polymer, suitably a rubber is dissolved in a solvent to form a solution. A suitable rubber, for example, may be polyisobutylene such as that marketed by BASF under its OPPONOL label although other soluble, relatively high molecular weight rubbers may be used as well. Solvents which may be used for this purpose preferably have a relatively high volatility and may comprise, for example, isooctane, light petroleum naphthas, some of the chlorinated hydrocarbons such as trichloroethane, and similar solvents either singly or in admixture.

The resulting solution is diluted if necessary to obtain a relatively thin liquid which may be conveniently applied to the non-woven mat layer 71 of mantle 69 by spraying in a coarse mist, by brushing, or by otherwise applying the solution to wet the individual fibers of the non-woven mat. After applying sufficient polymer solution to wet the fiber surfaces, the mat layer is dried to evaporate the solvent leaving the fiber surfaces covered by a rubber film. The rubber coated fibers display an attractiveness to oil and other hydrocarbons far greater than that of the untreated fibers.

The effectiveness of the rubber solution in increasing the oil-avid nature of the fiber surfaces may be even further enhanced by adding certain other materials to the solution. A number of fillers conventionally used in rubber compounding, especially carbon black, have been found to add stability to the rubber coating thus increasing its useful life. Certain water soluble materials have been found to provide advantages as well. Materials useful for that purpose broadly include solid materials in finely divided form which are generally insoluble in hydrocarbons but soluble in water such as salts and like compounds. In particular, the addition of a minor amount of a water soluble polymer in finely powdered form has been found to improve the performance of the oil-avid coating. Preferred water soluble polymers include ethylene oxide polymers of relatively high molecular weight such as those sold by Union Carbide Corporation under the POLYOX trademark. The water soluble particles are believed to dissolve as they are exposed to water during use of the skimmer. Fresh rubber surfaces are then made available to contact with oil thus renewing the oil-avid fiber surfaces.

Broadly speaking, formulations including solid fillers in an amount ranging from about 1 to 10 parts of filler and 5 to 20 parts of water soluble materials to 100 parts of rubber, all by weight, are useful in this invention. Specific formulations preferred for the purpose of enhancing the oil-avid nature of polymer fibers include solutions of a rubber such as polyisobutylene in suitable volatile solvents such as petroleum naphtha and having included therein finely divided carbon black and a powdered water soluble polymer such as POLYOX resin. Proportions of the materials are not critical but carbon black loading of about 1 to 2 parts per 100 parts of rubber and POLYOX loading of about 10 parts per 100 parts of rubber have provided excellent results. In all events, the solids loading should be kept relatively low so as to allow easy application of the liquid to a fiber mat or rug and the rubber should be present in major amount.

Turning again to FIG. 5, drum 12 of skimmer 10, having an oil-avid mantle of the type illustrated in FIG. 4 encircling the drum surface and covering the drum ends, is caused to rotate in the direction shown by the arrow. As the surface of the drum passes through floating oil layer 61 a layer of oil adheres to the oil-avid surface and is carried upward with the drum rotation. Water accompanies the oil, probably physically entrained with it, and is carried along with the oil on the drum surface. It has been conventional practice in the prior art to limit the rotational speed of the drum so that the bulk of the water separates from the oil and falls away as the drum surface ascends from the liquid surface. Prior art practice has been to operate at drum rim velocities in the range of about 10 to 50 feet per minute; more usually in the general range of 15 to 30 feet per minute depending in part upon the viscosity of the oil being recovered. That corresponds to a drum rotational speed of some 8 to 20 rpm for an 18 inch diameter drum. If drum speeds are increased much beyond that level then excessive water is carried over with the oil and, with even higher rotational velocities, the oil is flung off of the drum.

In operation of skimmer 10, the present invention departs completely from the practice of the prior art and operates the skimmer at drum rim velocities substantially greater than is contemplated in conventional practice. Specifically, drum 12 is rotated at a speed to produce a rim velocity of at least 100 feet per minute and preferably at rim velocities in the range of 150 to 500 feet per minute. At those velocities, a substantial amount of water is carried upwardly with the oil as the drum rotates and ascends from the liquid surface. The oil-avid surface of drum 12 allows a separation of water from the oil to be accomplished in a centrifugal fashion without significant loss of oil from the drum. The rotational velocity of the drum rim causes water entrained with the oil to separate therefrom and to be flung off of the drum in a spray or stream 80 and to fly beyond and over oil receiving slot 34 in front frame member 16. The upper and lower boundaries of slot 34 is shown as an arrowed arc on the periphery of member 16. Meanwhile, the oil clings as a layer 82 to the oil-avid drum surface and is diverted therefrom by scraper or wiper blade 36 into slot 34 formed in front frame member 16. Thus the provision of an oil-avid surface on drum 12 allows the drum to be operated at far higher rim velocities than is practical in with prior art devices without oil loss from the drum surface. The arrangement of slot 34, scraper 36, and the oil removal facilities incorporated into the skimmer coupled with a high drum rim velocity allows the skimmer to perform a dual function; recovery of oil from a water surface and separation of entrained water from the recovered oil. The oil recovery capacity of the skimmer is a function both of the amount of oil picked up per unit area of drum surface and the rim velocity of the drum. The oil-avid drum surface provided by this invention tends to increase the oil loading, or the amount of oil adhering to the drum surface per unit area. Likewise, the greatly increased rim velocity provides a concomitant increase in the recovery rate. The two effects together result in a skimmer capacity far greater than is obtainable using prior art skimmers.

Figure 6:
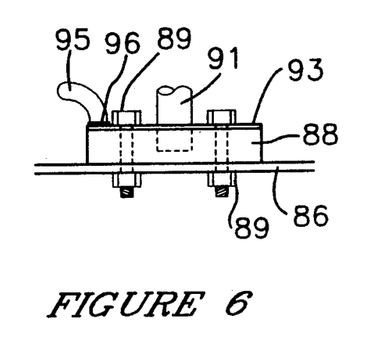
FIG. 6 is a detailed view of a preferred arrangement for mounting the drum.
Figure 7:
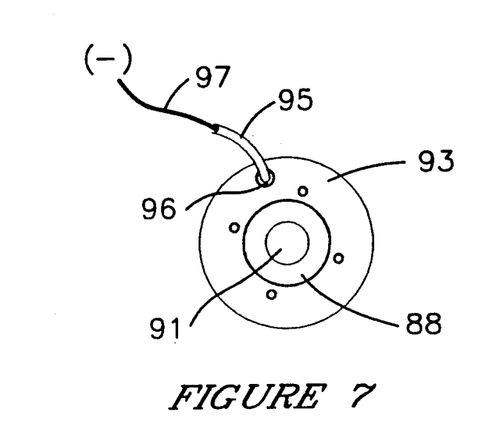
FIG. 7 shows a wiper assembly for making electrical connection between the drum and a source of current.

The recovery of hydrocarbons, especially those hydrocarbons having a significant vapor pressure, which have been spilled on water presents a certain degree of hazard. A stray spark or static current has the potential for igniting hydrocarbon vapors which have mixed with air to produce a fire or explosion. Static charges frequently build up on devices having parts which move through or relative to liquid hydrocarbons as do parts of the skimmer of this invention. This invention also contemplates arrangements to decrease the buildup of static charges and corrosion currents and to thereby increase the safety of the spill recovery operation. In this regard, FIG. 6 illustrates a preferred mode of mounting the drum 12 to the frame of the skimmer. There is shown in the Figure a drum end 86 of aluminum or other electrically conductive metal having a bearing-hub member 88 secured thereon by means of bolts or other conductive connectors 89. Member 88 is fabricated from a non-conductive structural material, suitably nylon, which serves to electrically isolate the drum from the body of the skimmer and serves as well to journal the drum axle 91. An annular ring 93, better seen in FIG. 7, fabricated of a conductive, corrosion resistant metal such as brass is secured to the outer side of hub 88 by means of bolts 89. Ring 93 and drum end 86 are thereby placed in electrical connection. A wiper arm 95 is arranged so that sliding contact 96 rubs upon ring 93 as the drum rotates thus establishing and maintaining an electrical connection between the end 86 of drum 12 and an electrical conductor 97 connected through arm 95 to contact 96. Conductor 97 is arranged to maintain the drum at a negative polarity in a manner which will be described later.

Figure 8:
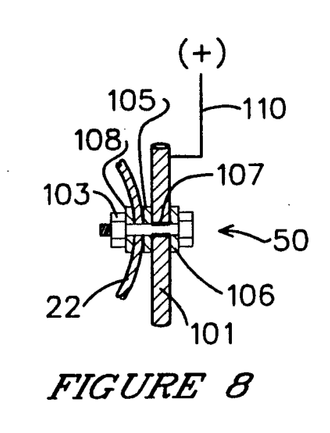
FIG. 8 shows details of the sacrificial anode assembly.

Turning now to FIG. 8, there is shown details of the sacrificial anode assembly 50 which is attached to the skimmer frame at a plurality of locations as is shown in FIGS. 1 and 5. Assembly 50 includes an anode 101 formed of an active metal such as zinc and of the kind conventionally used in marine corrosion control systems. Anode 101 is attached to the skimmer frame, for example to the rear frame member 22, by means of bolt 103. An insulating washer 105 separates anode 101 from the wall of frame member 22 while a similar insulating washer 106 isolates the anode from the bolt head. An insulating bushing 107 separates the anode from the bolt shaft. A sealing washer 108 prevents water entry into the interior of member 22. Thus, the combination of insulating washers 105 and 106 and insulating bushing 107 serves to prevent contact between the anode 101 and the bolt 103 maintaining the anode in electrical isolation from the skimmer frame.

Figure 9:
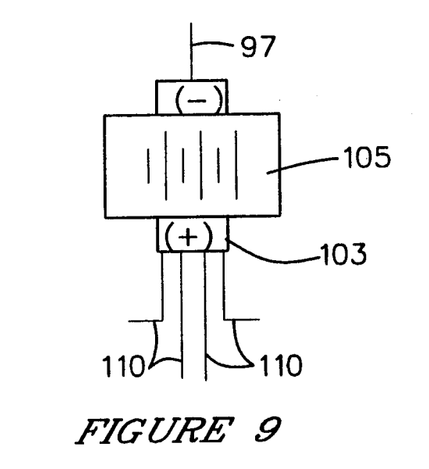
FIG. 9 is a diagram of the wiring arrangement connecting the drum and sacrificial anodes.

An electrical conductor 110 is attached to anode 10 and connects the anodes 101 of the various anode assemblies 50 to the positive output 103 of a current source 105 (FIG. 9). Conductor 97, which attaches to drum 12 through wiper assembly 95 and conductive ring 93, is connected to the negative output of current source 105. Thus, the skimmer drum is maintained at a negative polarity relative to the anodes 101. Current source 105 is of the kind used for the galvanic protection of boats from the effects of corrosion and produces an output potential of a few volts. It may be battery powered and located at a convenient place within the skimmer frame. The anodes and current source provide at least some degree of protection against the buildup of static charges caused by rotation of the drum. Further, it appears that there is another beneficial effect accruing from locating the anodes as shown in FIG. 1, to the sides and to the rear of the drum. An electrical field appears to be created around and to the rear of the skimmer drum which tends to aid in the gathering of oil to the drum and its removal from the water surface.

Yet another embodiment of the invention is shown in FIG. 10. FIG. 10 depicts a skimmer constructed in a similar fashion to that shown in FIG. 1 except that the rear frame of the skimmer is of V-shape and is coupled to a positive displacement pump forming an integral part of the skimmer. Referring now to FIG. 10, there is shown a skimmer 120 having a drum 12, front frame member 16, side frame members 18 and 20 and rear frame members 122 and 123. Rear members 122 and 123 connect to side members 18 and 20 respectively just back of the drum and the other ends of the rear members are directed inwardly to meet at the skimmer midline. A conduit 124 close couples the rear frame members to a positive displacement pump 125 disposed within a water tight float compartment 127. Compartment 127 is sized according to the weight of pump 125 to provide sufficient buoyancy to counterbalance the pump and to maintain the skimmer frame in the same general attitude as shown in FIG. 5 when the skimmer is deployed for use. Another conduit 129 leads from the pump outlet through the wall of compartment 127 and terminates in connector 130 which may be used to attach hose lengths to convey oil to a barge, tank, or other storage and transport facility. In all other respects, skimmer 120 is constructed like skimmer 10 of FIG. 1 and operates in a similar fashion. Further, a pair of outriggers such as those depicted in FIG. 1 may be used with the FIG. 10 embodiment if desired.

Figure 11:
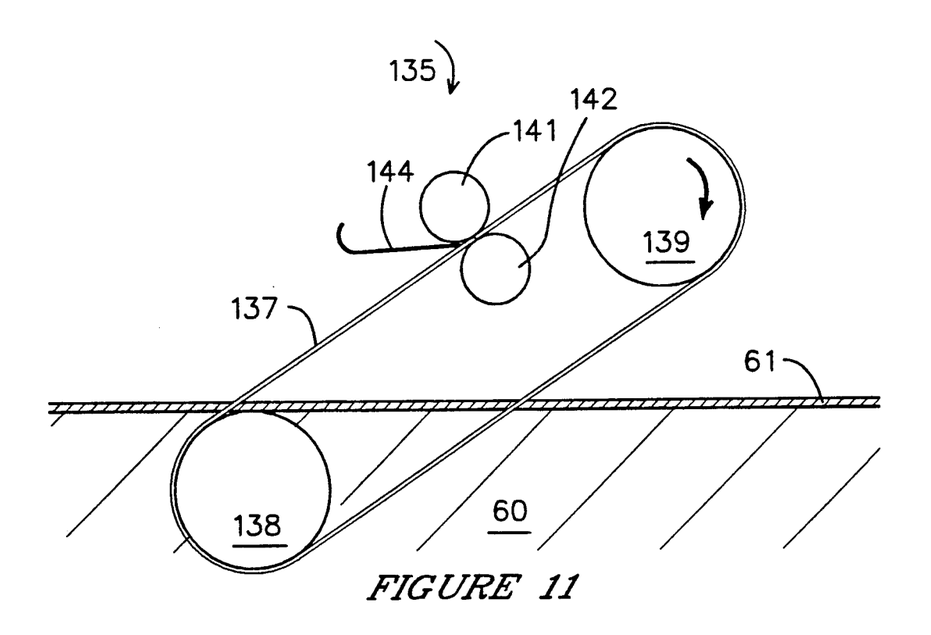
FIG. 11 illustrates the drum cover material as used with a different type of skimmer.

Although the disclosure of this invention has focussed on drum skimmers, the oil-avid contact material used to cover the skimmer drum may be used as well with other types of mechanical skimmers such as the belt skimmer 135 shown in FIG. 11. The specially treated mantle material 69 of FIG. 4 can be formed in the shape of an endless belt 137 which passes around an idler pulley 138 and a drive pulley 139 disposed above and to the side of pulley 138. Drive pulley 139 rotates in the direction shown by the arrow to cause the upper side of belt 137 to travel in an upward direction. In operation, the skimmer is deployed with the idler pulley at least partially submerged in water body 60 having a layer of oil 61 floating thereon. The surface of belt 137 contacts the floating oil layer and carries adhering oil upwardly to squeeze rolls 141 and 142 which remove most of the adhering oil and direct it into collection trough 144 for recovery. Rather than using a pair of squeeze rolls as shown, the oil adhering to belt 137 may be removed from the belt using a scraper.

Many other embodiments of the devices and methods of this invention in addition to those disclosed will be apparent to those skilled in the art. Further, the oil-avid contact materials described herein will find use for purposes other than oil skimmers and such other embodiments and uses are embraced by the appended claims.

I claim:

1. A device for removing oil floating on the surface of water comprising:

a buoyant rotatable drum supported in a frame, said frame having a front member disposed parallel to the axis of said drum and adjacent the surface thereof, two side members, each said side member rotatably supporting one drum end, and a rear member, each of said frame members defining a channel arranged to accommodate flow of liquid therein, said channels arranged to be in fluid communication, said rear member arranged to float on water and positioned relative to said drum so that said side members tilt downwardly placing said front member higher than said rear member when the device is deployed on water;

an oil receiving slot in the upper portion of said front frame member extending across the entire width of said drum;

scraper means contacting the surface of said drum and positioned to remove oil from the drum surface and direct it into said oil receiving slot;

an oil receiving slot in an upper forward part of each said side members, each said slot positioned adjacent a drum end and extending from the periphery of the drum toward the drum axis;

scraper means contacting the ends of said drum and positioned to remove oil from the drum end and direct it into said slots;

baffle means positioned within each channel of said side members rearwardly of said slots, said baffle means arranged to obstruct fluid flow through the upper portion of each channel while leaving a free space for liquid flow at the bottom of each channel; and means to remove liquid from the channel within said rear frame member.

2. The device of claim 1 including an oil-avid covering over the exterior fluid contacting surface of said drum, said oil-avid covering comprising a non-woven mat of oleophilic fibers, the surfaces of said fibers coated with a rubber film.

3. The device of claim 2 wherein the fibers of said non-woven mat are polypropylene and wherein said rubber film includes at least one other material selected from the o group consisting of finely divided particulate fillers and particulate water soluble substances.

4. The device of claim 3 wherein said filler is carbon black and wherein said particulate water soluble substance is a water soluble polymer.

5. The device of claim 1 wherein said drum is metal and is electrically isolated from said frame and wherein at least one anode consisting of an active metal is mounted on said frame and electrically isolated therefrom at a location whereat said anode is immersed in water when said device is deployed for use and including means to maintain said drum electrically negative relative to said anode.

6. The device of claim 5 including a plurality of anodes arranged in an arcuate pattern to the sides and rear of said drum.

7. The device of claim 1 including means for driving said drum to obtain a drum rim velocity in excess of 100 feet per minute.

8. In a mechanical device for recovering oil floating on water, said device having an oil contacting member arranged to move through said floating oil to remove therefrom an adhering layer of oil and having means to separate said adhering oil layer from said contacting member, the improvement comprising:

covering said oil contacting member with an oil-avid material, said oil-avid material comprising a non-woven mat of oleophilic fibers, substantially the entire surface of said fibers covered with a film of a hydrocarbon soluble non-crosslinked rubber.

9. The device of claim 8 wherein said oleophilic fibers are polypropylene and wherein said rubber film includes at least one other material selected from the group consisting of particulate fillers and particulate water soluble substances.

10. The device of claim 9 wherein said particulate filler is carbon black and Wherein said water soluble substance is an ethylene oxide polymer.

11. The device of claim 8 wherein said oil contacting member is a drum.

12. The device of claim 8 wherein said oil contacting member is a belt.

13. The device of claim 8 wherein said oil contacting member is a disc.

14. A method for operating a drum skimmer to recover oil floating on water comprising:

covering the oil contacting surface of said skimmer drum with an oil-avid material, said material comprising a non-woven mat of oleophilic fibers, substantially the entire surface of said fibers coated with a film of a hydrocarbon soluble non-crosslinked rubber;

continuously rotating said drum with its lower surface in contact with said floating oil to remove therefrom an adhering layer of oil with accompanying water;

adjusting the rotation rate of said drum so that its rim velocity is sufficiently fast to cause a separation of said accompanying water from said adhering oil layer; and removing said adhering oil layer from said drum surface.

15. The method of claim 14 wherein the rotation rate of said drum is set to provide a drum rim velocity greater than 100 feet per minute.

16. The method of claim 15 wherein said drum rim velocity is in the range of 150 to 500 feet per minute.

17. The method of claim 14 wherein said adhering oil layer is removed from the drum surface by a scraper member and is diverted into an oil receiving means.

18. The method of claim 14 wherein said oleophilic fibers are polypropylene and wherein said rubber film includes at least one other material selected from the group consisting of particulate fillers and particulate water soluble substances.

19. The method of claim 18 wherein said particulate filler is carbon black and said water soluble substance is an ethylene oxide polymer.

* * * * *